(12) United States Patent
Muta (10) Patent No.: US 11,339,734 B2
(45) Date of Patent: May 24, 2022

(54) HYBRID VEHICLE

(71) Applicant: Toyota Jidosha Kabushiki Kaisha, Toyota (JP)

(72) Inventor: Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 16/671,964

(22) Filed: Nov. 1, 2019

(65) Prior Publication Data

US 2020/0141341 A1 May 7, 2020

(30) Foreign Application Priority Data

Nov. 5, 2018 (JP) .............................. JP2018-208042

(51) Int. Cl.
*F02D 41/02* (2006.01)
*B60K 6/365* (2007.10)
(Continued)

(52) U.S. Cl.
CPC ........... *F02D 41/029* (2013.01); *B01D 46/80* (2022.01); *B60K 6/365* (2013.01); *B60K 6/40* (2013.01);
(Continued)

(58) Field of Classification Search
CPC .................. F02D 41/029; F02D 41/123; F02D 2200/0812; F02D 2200/602; B01D 46/80; B01D 2279/30; B60L 50/66; B60L 15/2009; B60L 2240/36; B60L 2240/423; B60L 2240/44; B60L 50/15; F01N 3/029; B60Y 2200/92; B60W 2520/10; B60W 2540/16; B60W 10/06; B60W 10/08; B60W 20/15; B60K 6/445
See application file for complete search history.

(56) References Cited

U.S. PATENT DOCUMENTS 9,512,796 B2 * 12/2016 Tsunooka .................. F01N 3/10
2014/0336904 A1 * 11/2014 Nakanishi ............. B60W 20/40
701/110

(Continued)

FOREIGN PATENT DOCUMENTS

JP 2012-111381 A 6/2012
JP 2015-202832 A 11/2015
(Continued)

*Primary Examiner* — George C Jin
(74) *Attorney, Agent, or Firm* — Dinsmore & Shohl LLP (57) ABSTRACT

A hybrid vehicle includes an engine, a first motor, a planetary, the first motor, and a drive shaft, such that the first motor, the engine, and the drive shaft are arranged in this order in a collinear diagram, a second motor configured to be connected to the drive shaft, a power storage device configured to exchange an electric power with the first motor and the second motor. A braking force is applied to a vehicle by motoring the engine, in which fuel injection is stopped, by the first motor and/or regenerative driving of the second motor, when an accelerator is not operated. Motoring of the engine, in which fuel injection is stopped, by the first motor is limited, in a case where a deposition amount of particulate matter deposited on the filter is equal to or higher than a predetermined amount, when an accelerator is not operated.

6 Claims, 3 Drawing Sheets

(51) Int. Cl.
  *B60K 6/40*   (2007.10)
  *F01N 3/029*  (2006.01)
  *B60L 50/60*  (2019.01)
  *F02D 41/12*  (2006.01)
  *B01D 46/80*  (2022.01)

(52) U.S. Cl.
  CPC .............. *B60L 50/66* (2019.02); *F01N 3/029* (2013.01); *F02D 41/123* (2013.01); *B01D 2279/30* (2013.01); *B60Y 2200/92* (2013.01); *F02D 2200/0812* (2013.01); *F02D 2200/602* (2013.01)

(56) References Cited

U.S. PATENT DOCUMENTS

| | | | |
|---|---|---|---|
| 2016/0201534 A1* | 7/2016 | Lambert | F01N 3/0253 60/274 |
| 2017/0260922 A1* | 9/2017 | Emig | F02D 41/2464 |
| 2018/0099656 A1 | 3/2018 | Kim et al. | |
| 2018/0106206 A1 | 4/2018 | Tsunoda et al. | |
| 2018/0126979 A1* | 5/2018 | Higa | B60K 6/445 |
| 2018/0274673 A1 | 9/2018 | Sugai et al. | |
| 2018/0283301 A1* | 10/2018 | Higa | B60W 50/082 |
| 2019/0323405 A1* | 10/2019 | Schubring | F02D 41/123 |
| 2020/0011226 A1* | 1/2020 | Kim | F01N 3/021 |

FOREIGN PATENT DOCUMENTS

| | | |
|---|---|---|
| JP | 2017-149233 A | 8/2017 |
| JP | 2018-062199 A | 4/2018 |
| JP | 2018-065448 A | 4/2018 |
| JP | 2018-075919 A | 5/2018 |
| JP | 2018-159296 A | 10/2018 |
| WO | 2015/159218 A2 | 10/2015 |

\* cited by examiner

FIG. 4

HYBRID VEHICLE

CROSS-REFERENCE TO RELATED APPLICATIONS

This application claims priority to Japanese Patent Application No. 2018-208042 filed on Nov. 5, 2018, which is incorporated herein by reference in its entirety including the specification, drawings and abstract.

BACKGROUND

1. Technical Field

The present disclosure relates to a hybrid vehicle, specifically, a hybrid vehicle including an engine in which a filter for removing particulate matter is attached to an exhaust system.

2. Description of Related Art

In the related art, as such a kind of hybrid vehicle, a vehicle including an engine in which a filter for removing particulate matter is attached to an exhaust system, a motor that is connected to an output shaft of the engine, and a battery that exchanges an electric power with the motor, in which filter regeneration is performed has been proposed (for example, see Japanese Unexamined Patent Application Publication No. 2015-202832 (JP 2015-202832 A)). In such a hybrid vehicle, when the filter regeneration is needed, a control range of a residual capacity of the battery is expanded as compared with a case where filter regeneration is not needed, the residual capacity is reduced below a lower limit of the pre-expansion control range and increases above an upper limit of the pre-expansion control range, and thereafter, fuel injection in the engine is stopped and the engine is motored by the motor. When fuel injection in the engine is stopped, air containing oxygen is supplied to the filter and the particulate matter burns, and thus filter regeneration is performed.

SUMMARY

In the above-described hybrid vehicle, when fuel injection in the engine is stopped in order to perform filter regeneration, the filter may be overheated due to the temperature rise of the filter due to burning of particulate matter deposited on the filter.

The main object of a hybrid vehicle of an aspect of the present disclosure is to suppress overheating of the filter.

The hybrid vehicle of an aspect of the present disclosure employs the following to achieve the main object described above.

A first aspect of the present disclosure relates to a hybrid vehicle including an engine, a first motor, a planetary gear, a second motor, a power storage device, and a control device. In the engine, a filter for removing particulate matter is attached to an exhaust system. In the planetary gear, three rotational elements are connected to the engine, the first motor, and a drive shaft coupled to an axle, such that the first motor, the engine, and the drive shaft are arranged in this order in a collinear diagram. The second motor is configured to be connected to the drive shaft. The power storage device is configured to exchange an electric power with the first motor and the second motor. The control device is configured to apply a braking force to a vehicle by motoring the engine, in which fuel injection is stopped, by the first motor and/or regenerative driving of the second motor, when an accelerator is not operated. The control device limits motoring of the engine in which fuel injection is stopped, by the first motor, in a case where a deposition amount of particulate matter deposited on the filter is equal to or higher than a predetermined amount, when an accelerator is not operated.

In the hybrid vehicle according to the first aspect, when an accelerator is not operated, a braking force may be applied to the vehicle by motoring the engine, in which fuel injection is stopped, by the first motor and/or regenerative driving of the second motor. Further, motoring of the engine, in which fuel injection is stopped, by the first motor is limited, in a case where a deposition amount of particulate matter deposited in the filter is equal to or higher than a predetermined amount, when an accelerator is not operated. Accordingly, when an accelerator is not operated, since the amount of air supplied to the filter can be limited, the temperature rise of the filter due to burning of particulate matter deposited on the filter can be suppressed, and thus overheating of the filter can be suppressed.

In the hybrid vehicle according to the first aspect, the control device may be configured to autonomously operate the engine, in a case where the deposition amount is equal to or higher than the predetermined amount, when an accelerator is not operated. In this way, overheating of the filter can be further suppressed. In this case, the control device may autonomously operate the engine and perform regenerative driving of the second motor within a range of allowable input power, in a case where the deposition amount is equal to or higher than the predetermined amount, when an accelerator is not operated. In this way, an excessive electric power is suppressed to be input to the power storage device, and the braking force can be caused to be applied to the vehicle.

In the hybrid vehicle according to the first aspect, the control device may be configured to prohibit selection of a brake position at which a request braking force when an accelerator is not operated is larger than a drive position, as a shift position, in a case where the deposition amount is equal to or higher than the predetermined amount. Also, the control device may be configured to prohibit selection of a sequential position at which a request braking force when an accelerator is not operated is changed in a plurality of stages, as a shift position, in a case where the deposition amount is equal to or higher than the predetermined amount. By doing so, a large braking force can be prevented from being requested to the vehicle.

In the hybrid vehicle according to the first aspect, the control device may be configured to control the engine so that an air-fuel ratio becomes lean, in a case where the deposition amount is equal to or higher than the predetermined amount, when the engine is operated. In this way, when the engine is operated, air (oxygen) can be supplied to the filter to burn particulate matter deposited on the filter.

In the hybrid vehicle according to the first aspect, the control device may be configured to limit motoring of the engine by the first motor as compared with a case where the deposition amount is lower than the predetermined amount, in a case where the deposition amount is equal to or higher than the predetermined amount, when an accelerator is not operated in a maintenance mode. In the maintenance mode, since the driver (for example, a dealer worker) recognizes that the maintenance mode is set, when motoring of the engine by the first motor when an accelerator is not operated is limited, the driver is less likely to feel uncomfortable.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment for implementing the present disclosure will be described.

Figure 1:
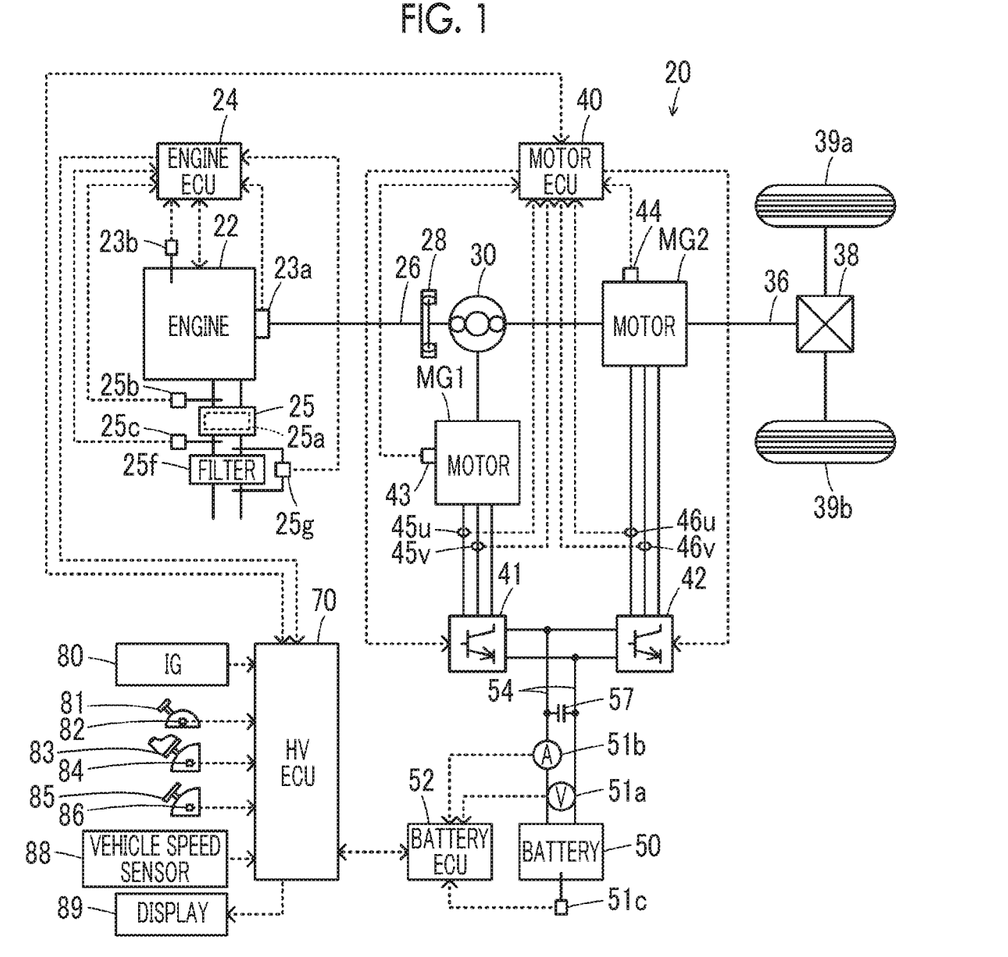
FIG. 1 is a configuration diagram showing an outline of a configuration of a hybrid vehicle 20 as an embodiment of the present disclosure.

FIG. 1 is a configuration diagram showing an outline of a configuration of a hybrid vehicle 20 as an embodiment of the present disclosure. A hybrid vehicle 20 of the embodiment includes, as shown in FIG. 1, an engine 22, a planetary gear 30, motors MG1, MG2, inverters 41, 42, a battery 50 as a power storage device, a hybrid electronic control unit (hereinafter, referred to as "HVECU") 70.

The engine 22 is configured as an internal combustion engine that outputs a power using gasoline or light oil as fuel, and is connected to a carrier of the planetary gear 30 via a damper 28. An exhaust gas control apparatus 25 and a particulate matter removal filter (hereinafter referred to as "PM filter") 25f are attached to an exhaust system of the engine 22. The exhaust gas control apparatus 25 includes a catalyst 25a that removes unburned fuel and nitrogen oxides in the exhaust gas of the engine 22. The PM filter 25f is formed as a porous filter with ceramics, stainless steel, or the like, and captures particulate matter (PM) such as soot in the exhaust gas. The operation of the engine 22 is controlled by an engine electronic control unit (hereinafter referred to as "engine ECU") 24.

The engine ECU 24 is configured as a microprocessor centered on a CPU (not shown). In addition to the CPU, the engine ECU 24 includes a ROM that stores processing programs, a RAM that temporarily stores data, an input/output port, and a communication port. The engine ECU 24 receives signals from various sensors needed to control the operation of the engine 22 via an input port. Examples of the signals input to the engine ECU 24 include a crank angle θcr obtained from a crank position sensor 23a that detects a rotational position of a crankshaft 26 of the engine 22, and a coolant temperature Tw obtained from a coolant temperature sensor 23b that detects a temperature of coolant in the engine 22. Examples of the signals input to the engine ECU 24 also include an air-fuel ratio AF obtained from an air-fuel ratio sensor 25b attached to the upstream side of the exhaust gas control apparatus 25 in the exhaust system of the engine 22, or an oxygen signal O2 obtained from an oxygen sensor 25c attached to the downstream side of the exhaust gas control apparatus 25 in the exhaust system of the engine 22. Furthermore, examples of the signals input to the engine ECU 24 also include a differential pressure ΔP obtained from a differential pressure sensor 25g that detects the differential pressure before and after the PM filter 25f (the differential pressure between the upstream side and the downstream side). The engine ECU 24 outputs various control signals for controlling the operation of the engine 22 via an output port. The engine ECU 24 is connected to the HVECU 70 via a communication port.

The engine ECU 24 calculates (estimates) the engine speed Ne of the engine 22 based on the crank angle θcr obtained from the crank position sensor 23a, or calculates the temperature (catalyst temperature) Tc of the catalyst 25a based on the coolant temperature Tw obtained from the coolant temperature sensor 23b. Also, the engine ECU 24 calculates the volumetric efficiency (a ratio of an amount of air actually taken into the engine 22 per one cycle to a stroke volume of the engine 22 per one cycle) KL based on the intake air amount Qa obtained from an air flow meter (not shown) and the engine speed Ne of the engine. Furthermore, the engine ECU 24 calculates (estimates) deposition amount Qpm of PM as the deposition amount of particulate matter deposited on the PM filter 25f based on the differential pressure ΔP obtained from the differential pressure sensor 25g, and calculates (estimates) a filter temperature Tf as the temperature of the PM filter 25f based on the engine speed Ne or the volumetric efficiency KL of the engine 22.

The planetary gear 30 is configured as a single-pinion type planetary gear mechanism, and includes a sun gear, a ring gear, a plurality of pinion gears that meshes with the sun gear and the ring gear, and the carrier that rotatably and revolvably supports the pinion gears. The sun gear of planetary gear 30 is connected to a rotor of the motor MG1. The ring gear of the planetary gear 30 is connected to a drive shaft 36 that is coupled to drive wheels 39a, 39b via a differential gear 38. As described above, the crankshaft 26 of the engine 22 is connected to the carrier of the planetary gear 30 via the damper 28. Therefore, the motor MG1, the engine 22, the drive shaft 36, and the motor MG2 are connected to the sun gear, the carrier, and the ring gear as the three rotational elements of the planetary gear 30 such that the motor MG1, the engine 22, the drive shaft 36, and the motor MG2 are arranged in this order in a collinear diagram of the planetary gear 30.

The motor MG1 is configured as, for example, a synchronous generator motor, and the rotor of the motor MG1 is connected to the sun gear of the planetary gear 30 as described above. The motor MG2 is configured as, for example, a synchronous generator motor, and the rotor of the motor MG2 is connected to the drive shaft 36. The inverters 41, 42 are used to drive the motors MG1, MG2 and connected to battery 50 via a power line 54. A smoothing capacitor 57 is attached to the power line 54. The motors MG1, MG2 are rotationally driven by switching control of a plurality of switching elements (not shown) of the inverters 41, 42 by a motor electronic control unit (hereinafter referred to as "motor ECU") 40.

The motor ECU 40 is configured as a microprocessor centered on a CPU (not shown). In addition to the CPU, the motor ECU 40 includes a ROM that stores processing programs, a RAM that temporarily stores data, an input/output port, and a communication port. The motor ECU 40 receives signals from various sensors needed to control the driving of the motors MG1, MG2, for example, rotational positions θm1, θm2 obtained from rotational position detecting sensors 43, 44 that detect the rotational position of rotor of each of the motors MG1, MG2, phase currents Iu1, Iv1, Iu2, Iv2 obtained from current sensors 45u, 45v, 46u, 46v that detect current flowing to each phase of the motors MG1, MG2, via the input port. The motor ECU 40 outputs the switching control signals to the switching elements of the inverters 41, 42 via the output port. The motor ECU 40 is connected to the HVECU 70 via the communication port. The motor ECU 40 calculates electrical angles $\theta e1$, $\theta e2$ or angular velocities $\omega m1$, $\omega m2$, the rotation speeds Nm1, Nm2 of the motors MG1, MG2 based on the rotational positions $\theta m1$, $\theta m2$ of the rotors of the motors MG1, MG2 obtained from the rotational position detecting sensors 43, 44.

The battery 50 is configured as, for example, a lithium ion secondary battery or a nickel hydride secondary battery, and is connected to the power line 54. The battery 50 is managed by a battery electronic control unit (hereinafter referred to as "battery ECU") 52.

The battery ECU 52 is configured as a microprocessor centered on a CPU (not shown). In addition to the CPU, the battery ECU 52 includes a ROM that stores processing programs, a RAM that temporarily stores data, an input/output port, and a communication port. The battery ECU 52 receives signals from various sensors needed to manage the battery 50 via the input port. Examples of the signals input to the battery ECU 52 include a voltage Vb of the battery 50 obtained from a voltage sensor 51a attached between terminals of the battery 50, current Ib of the battery 50 obtained from the current sensor 51b attached to an output terminal of the battery 50, or a temperature Tb of the battery 50 obtained from a temperature sensor 51c attached to the battery 50. The battery ECU 52 is connected to the HVECU 70 via the communication port. The battery ECU 52 calculates a power storage ratio SOC based on the integrated value of the current Ib of the battery 50 obtained from the current sensor 51b, or calculates input/output limits Win, Wout of the battery 50 based on the calculated power storage ratio SOC and the temperature Tb of the battery 50 obtained from the temperature sensor 51c. The power storage ratio SOC is the ratio of the amount of power that can be discharged from the battery 50 to the total capacity of the battery 50, and the input/output limits Win, Wout are allowable input/output power that may charge and discharge the battery 50.

The HVECU 70 is configured as a microprocessor centered on a CPU (not shown). In addition to the CPU, the HVECU 70 includes a ROM that stores processing programs, a RAM that temporarily stores data, an input/output port, and a communication port. The HVECU 70 receives signals from various sensors via the input port. Examples of the signals input to the HVECU 70 include an ignition signal from an ignition switch 80 and a shift position SP from a shift position sensor 82 that detects an operation position of a shift lever 81. Examples of the signals input to the HVECU 70 also include an accelerator operation amount Ace obtained from an accelerator pedal position sensor 84 that detects a depression amount of an accelerator pedal 83, a brake pedal position BP obtained from a brake pedal position sensor 86 that detects a depression amount of a brake pedal 85, and a vehicle speed V obtained from a vehicle speed sensor 88. The HVECU 70 outputs the control signal to the display 89 for displaying various information via the output port. As described above, the HVECU 70 is connected to the engine ECU 24, the motor ECU 40, or the battery ECU 52 via the communication port.

Here, as the shift position SP, a parking position (P position) used for parking, a reverse position (R position) used for reverse travel, a neutral position (N position), a normal drive position (D position) used for forward travel, a brake position (B position) at which a request braking force when an accelerator is not operated is larger than the D position, and a sequential position (S position) at which a request braking force when an accelerator is not operated is changed within a wider range than that of the D position in a plurality of stages (for example, 6 stages) are provided. At the S position, the driver can feel speed change by virtual stepped transmission.

The hybrid vehicle 20 of the embodiment configured as described above travels in a hybrid travel mode (HV travel mode) where traveling is performed with revolution of the engine 22 or an electric travel mode (EV travel mode) where traveling is performed with the revolution of the engine 22 being stopped.

When an accelerator is operated in the HV travel mode, the HVECU 70 sets a traveling torque Td* needed to travel (needed for the drive shaft 36) based on the shift position SP, the accelerator operation amount Acc and the vehicle speed V, and calculates a traveling power Pd* needed to travel by multiplying the set traveling torque Td* by the rotation speed Nd of the drive shaft 36 (the rotation speed Nm2 of the motor MG2). Subsequently, the HVECU 70 calculates a target power Pe* of the engine 22 by subtracting a charge/discharge request power Pb* (a positive value when discharging from the battery 50) from the traveling power Pd* of the battery 50, and sets the target engine speed Ne* or target torque Te* of the engine 22, and the torque commands Tm1*, Tm2* of the motors MG1, MG2 so that the calculated target power Pe* is output from the engine 22, and the traveling torque Td* (traveling power Pd*) is output to the drive shaft 36 in a range of the input/output limits Win, Wout of the battery 50. The target engine speed Ne* or the target torque Te* of the engine 22 is transmitted to the engine ECU 24 and the torque commands Tm1*, Tm2* of the motors MG1, MG2 are transmitted to the motor ECU 40. When the engine ECU 24 receives the target engine speed Ne* and the target torque Te* of the engine 22, the engine ECU 24 performs operation control (intake air amount control, fuel injection control, or ignition control) of the engine 22 so that the engine 22 is operated based on the target engine speed Ne* and the target torque Te*. When the motor ECU 40 receives the torque commands Tm1*, Tm2* of the motors MG1, MG2, the motor ECU 40 performs switching control of the switching elements of the inverters 41, 42 so that the motors MG1, MG2 is driven by the torque commands Tm1*, Tm2*. The control when an accelerator is not operated in the HV travel mode will be described below.

In the EV travel mode, the HVECU 70 sets the traveling torque Td* based on the accelerator operation amount Acc and the vehicle speed V, sets the value 0 to the torque command Tm1* of the motor MG1, sets the torque command Tm2* of the motor MG2 so that the traveling torque Td* is output to the drive shaft 36 in a range of the input/output limits Win, Wout of the battery 50, and transmits the torque commands Tm1*, Tm2* of the motor MG1, MG2 to the motor ECU 40. The control of the inverters 41, 42 by the motor ECU 40 is described above.

Further, in the hybrid vehicle 20 of the embodiment, in a case where a filter regeneration condition for regenerating the PM filter 25f is satisfied when an accelerator is operated in the HV travel mode, the engine 22 is operated with the air-fuel ratio being lean as compared with a case where the filter regeneration condition is not satisfied. As a result, air (oxygen) is supplied to the PM filter 25f to burn the particulate matter deposited on the PM filter 25f, and the PM filter 25f is regenerated. As the filter regeneration condition, a condition where the deposition amount Qpm of PM is equal to or higher than a threshold value Qpmref and a filter temperature Tf of the PM filter 25f is equal to or higher than a threshold value Tfref is used. The threshold value Qpmref is a threshold value for determining whether or not the regeneration of the PM filter 25*f* is needed, and for example, 3 g/L, 4 g/L, or 5 g/L is used. The threshold value Tfref is a threshold value for determining whether or not the filter temperature Tf reaches a reproducible temperature suitable for regeneration of the PM filter 25*f*, and for example, 580° C., 600° C., or 620° C. is used.

Figure 2:
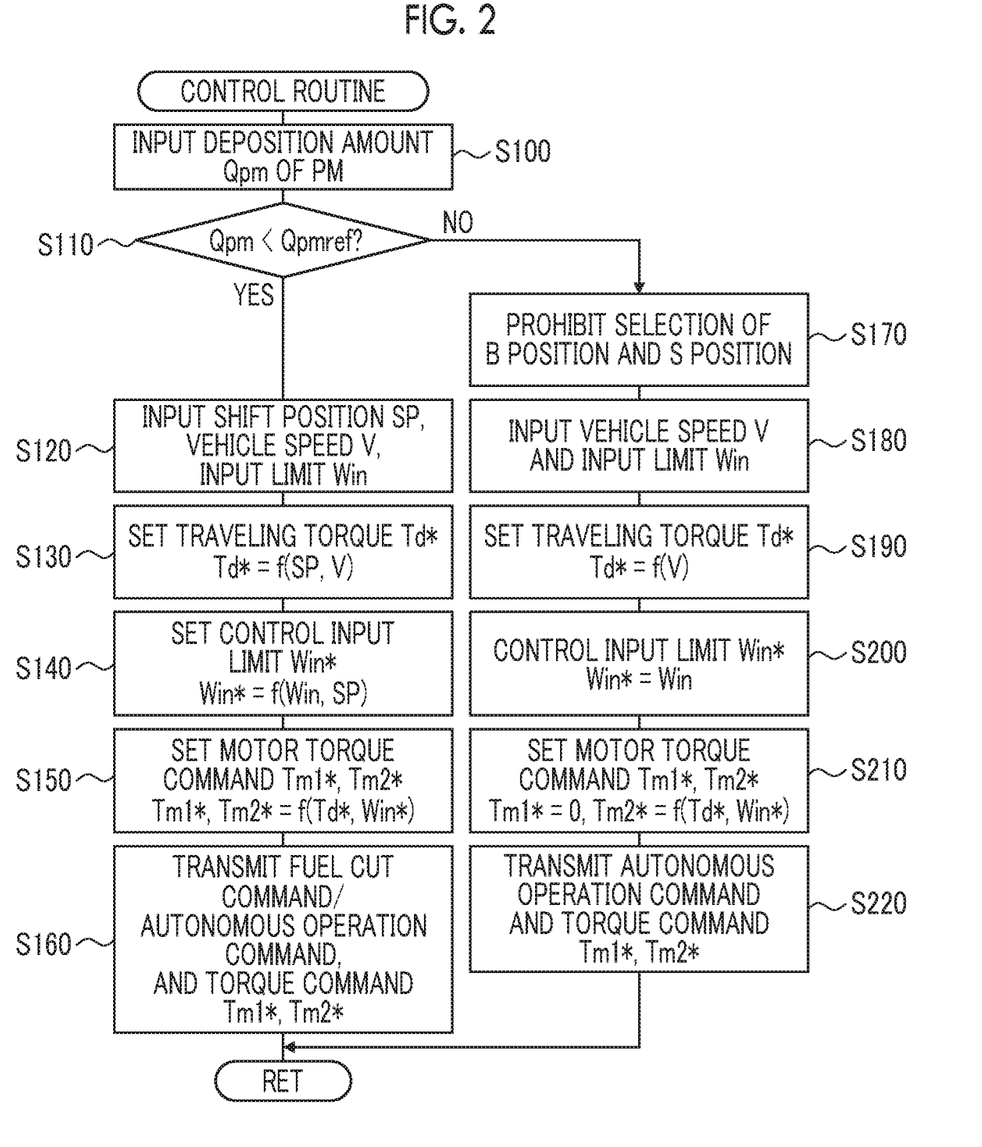
FIG. 2 is an explanatory diagram showing an example of a control routine executed by an HVECU 70.

Next, the operation of the hybrid vehicle 20 of the embodiment configured as described above, particularly the operation of the hybrid vehicle 20 when an accelerator is not operated in the HV travel mode will be described. FIG. 2 is an explanatory diagram showing an example of a control routine executed by the HVECU 70. This routine is repeatedly executed when an accelerator is not operated in the HV travel mode.

When the control routine in FIG. 2 is executed, the HVECU 70 inputs the deposition amount Qpm of PM (Step S100) and compares the input deposition amount Qpm of PM with the above-described threshold value Qpmref (Step S110).

Here, as the deposition amount Qpm of PM, a value calculated by the engine ECU 24 is input by communication.

When the deposition amount Qpm of PM is lower than the threshold value Qpmref, the shift position SP, the vehicle speed V, or the input limit Win of the battery 50 is input (Step S120). Here, a value detected by the shift position sensor 82 is input as the shift position SP. As the vehicle speed V, a value detected by the vehicle speed sensor 88 is input. As the input limit Win of the battery 50, a value calculated by the battery ECU 52 is input by communication.

Figure 3:
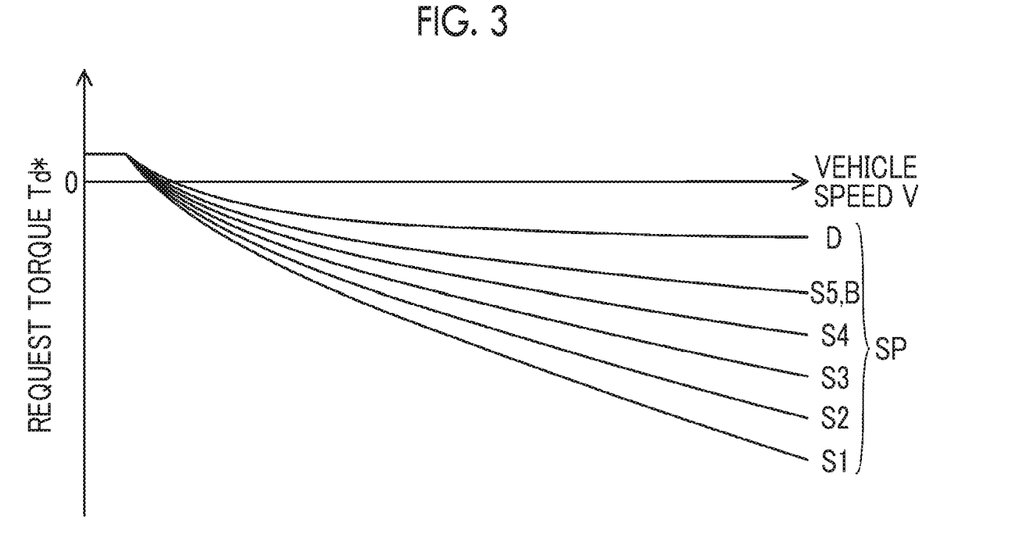
FIG. 3 is an explanatory diagram showing an example of a map for setting traveling torque.

When the data is input as described above, the traveling torque Td* is set based on the input shift position SP and the input vehicle speed V (Step S130). Here, regarding the traveling torque Td* of the embodiment, the relationship between the shift position SP, the vehicle speed V, and the traveling torque Td* is predetermined and stored in the ROM (not shown) as a map for setting traveling torque. When the shift position SP and the vehicle speed V are given, the corresponding traveling torque Td* is derived and set from the map. FIG. 3 is an explanatory diagram showing an example of a map for setting traveling torque. As shown in the figure, the traveling torque Td* is set so as to decrease when the shift position SP is the B position or the S position as compared with the D position in the negative range in a region where the vehicle speed V is equal to or higher than the threshold value Vref (so that the absolute value increases) and decreases as the gear stage is in the lower gear stage side when the shift position SP is the S position.

Subsequently, a control input limit Win* for the battery 50 is set based on the input limit Win of the battery 50 and the shift position SP (Step S140). In the processing above, when the shift position SP is the D position, the input limit Win of the battery 50 is set as the control input limit Win*, and when the shift position SP is the B position or the S position, a value obtained by multiplying the input limit Win of the battery 50 by correction coefficients kb, ks that are lower than the value 1 is set as the control input limit Win*. As the correction coefficient ks, a uniform value may be used, or a value smaller as the gear stage is in the lower speed side may be used.

The torque commands Tm1*, Tm2* of the motors MG1, MG2 are set so that the traveling torque Td* is output to the drive shaft 36 within a range of the control input limit Win* of the battery 50 (Step S150), a fuel cut command or an autonomous operation command of the engine 22 are transmitted to the engine ECU 24, the torque commands Tm1*, Tm2* of the motors MG1, MG2 are transmitted to the motor ECU 40 (Step S160), and this routine ends. When the fuel cut command is received, the engine ECU 24 stops the fuel injection control and the ignition control of the engine 22, and when the autonomous operation command is received, the engine ECU 24 performs the operation control of the engine 22 so that the engine 22 is autonomously operated. The control of the motors MG1, MG2 by the motor ECU 40 is described above.

In the embodiment, when the traveling power Pd* obtained by multiplying the traveling torque Td* by the rotation speed Nd (the rotation speed Nm2 of the motor MG2) of the drive shaft 36 is within a range of the control input limit Win* of the battery 50, the engine 22 is autonomously operated and the traveling torque Td* is output to the drive shaft 36 by regenerative driving of the motor MG2, and when the traveling power Pd* is out of a range of the control input limit Win* of the battery 50, the traveling torque Td* is output to the drive shaft 36 by motoring of the engine 22 in which fuel injection is stopped, by the motor MG1 and regenerative driving of the motor MG2.

Figure 4:
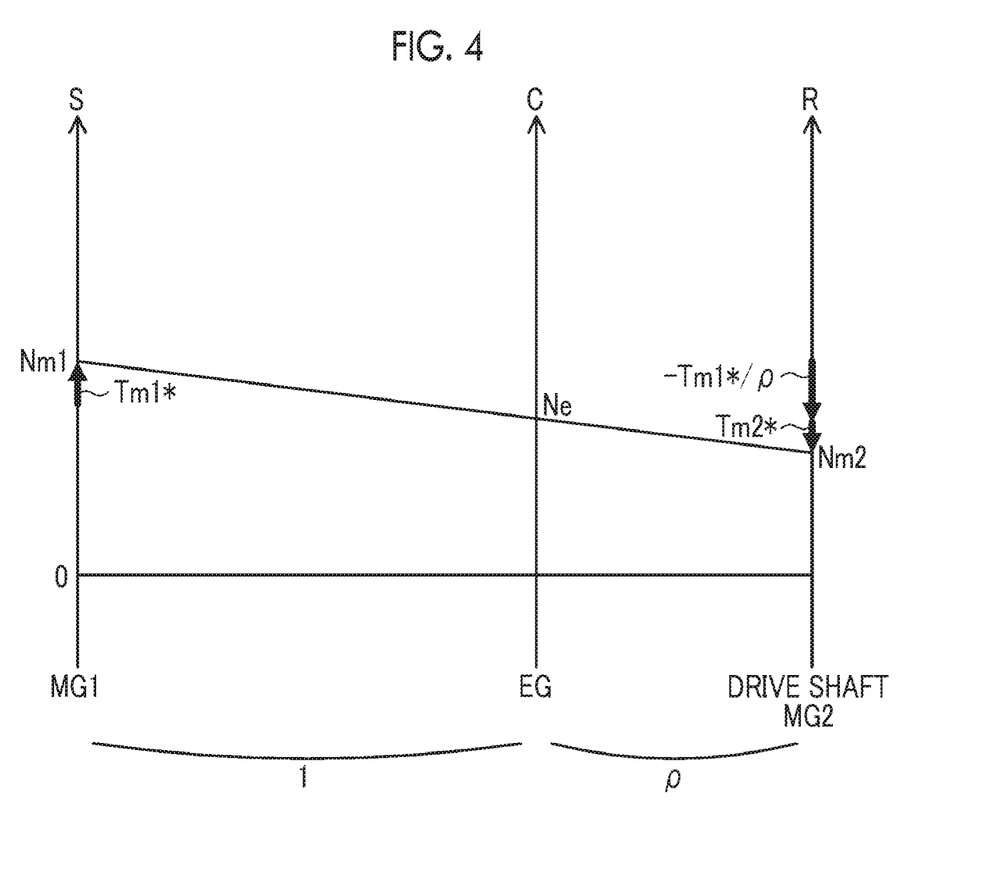
FIG. 4 is an explanatory diagram showing an example of a collinear diagram of a planetary gear 30.

FIG. 4 is an explanatory diagram showing an example of a collinear diagram of the planetary gear 30. In FIG. 4, the S axis on the left side indicates the rotation speed of the sun gear of the planetary gear 30 that is the rotation speed Nm1 of the motor MG1, the C axis indicates the rotation speed of the carrier of the planetary gear 30 that is the engine speed Ne of the engine 22, and the R axis indicates the rotation speed the ring gear of the planetary gear 30 that is the rotation speed Nd of the drive shaft 36 and the rotation speed Nm2 of the motor MG2. Also, in FIG. 4, "ρ" indicates a gear ratio (the number of teeth of the sun gear/the number of teeth of the ring gear) of the planetary gear 30. In a case where motoring of the engine 22 by the motor MG1 and regenerative driving of the motor MG2, as shown in FIG. 4, when the motors MG1, MG2 are driven by the torque commands Tm1*, Tm2*, torque (Tm2*) output from the motor MG2 is output to the drive shaft 36 and torque (−Tm1*/ρ) output from the motor MG1 via the planetary gear 30 is output to the drive shaft 36. The torque command Tm1* of the motor MG1 increases as the engine speed Ne of the engine 22 increases. Because the friction increases as the engine speed Ne of the engine 22 increases. As described above, when the shift position SP is the B position or the S position, the absolute value of the traveling torque Td* increases and the absolute value of the control input limit Win* decreases as compared with the D position. Therefore, the absolute value of the torque command Tm2* of the motor MG2 decreases and the engine speed Ne of the engine 22 and the absolute value of the torque command Tm1* of the motor MG1 increase.

When the deposition amount Qpm of PM is equal to or higher than the threshold value Qpmref in Step S110, selection of the B position or the S position as the shift position SP is prohibited (Step S170). The vehicle speed V or the input limit Win of the battery 50 is input (Step S180), the traveling torque Td* is set using the vehicle speed V and the map for setting traveling torque of FIG. 3 in a state where the shift position SP is the D position (Step S190).

Subsequently, the input limit Win of the battery 50 is set as the control input limit Win* (Step S200), the value 0 is set to the torque command Tm1* of the motor MG1 and the torque command Tm2* of the motor MG2 is set so that the traveling torque Td* is output to the drive shaft 36 in a range of the input limit Win of the battery 50 (Step S210), the autonomous operation command of the engine 22 is transmitted to the engine ECU 24 and the torque commands Tm1*, Tm2* of the motors MG1, MG2 are transmitted to the motor ECU 40 (Step S220), and the routine ends.

Since the amount of air supplied to the PM filter 25f can be reduced by autonomously operating the engine 22 as compared with a case where fuel cut of the engine 22 is performed, the temperature rise of the PM filter 25f due to burning of the particulate matter deposited on the PM filter 25f can be suppressed, and overheating of the PM filter 25f can be suppressed. In this case, the engine 22 is autonomously operated, and fuel cut of the engine 22 and motoring of the engine 22 by the motor MG1 are not performed, a regenerative power of the motor MG2 decreases as the absolute value of the input limit Win of the battery 50 decreases, and thus the braking force of the vehicle decreases. Since the driver may feel uncomfortable in a case where the braking force of the vehicle is small when the driver desires a certain level of braking force (deceleration), in the embodiment, selection of the B position or the S position as the shift position SP is prohibited. Notice of prohibition of selection of the B position or the S position as the shift position SP is may be performed to the driver by displaying of display 89.

In the hybrid vehicle 20 of the embodiment described above, the engine 22 is autonomously operated when the deposition amount Qpm of PM is equal to or higher than the threshold value Qpmref when an accelerator is not operated. Since the amount of air supplied to the PM filter 25f can be reduced as compared with a case where fuel cut of the engine 22 and motoring of the engine 22 by the motor MG1 are performed, the temperature rise of the PM filter 25f due to burning of the particulate matter deposited on the PM filter 25f can be suppressed, and overheating of the PM filter 25f can be suppressed.

In the hybrid vehicle 20 of the embodiment, when the deposition amount Qpm of PM is equal to or higher than the threshold value Qpmref when an accelerator is not operated, selection of the B position or the S position as the shift position SP is prohibited, but the selection may be not prohibited.

In the hybrid vehicle 20 of the embodiment, when the deposition amount Qpm of PM is equal to or higher than the threshold value Qpmref when an accelerator is not operated, the engine 22 is assumed to autonomously operate. However, motoring of the engine 22 in which fuel injection is stopped, by the motor MG1 need only be limited, and thus, for example, fuel cut of the engine 22 may be performed and the engine 22 may be motored by the motor MG1 such that the engine 22 rotates by the lower engine speed as compared with a case where the deposition amount Qpm of PM is lower than the threshold value Qpmref.

In the hybrid vehicle 20 of the embodiment, when the deposition amount Qpm of PM is equal to or higher than the threshold value Qpmref and the filter regeneration condition is satisfied with an accelerator being operated, the engine 22 is operated with the air-fuel ratio being lean, and thus the particulate matter deposited on the PM filter 25f burns to regenerate the PM filter 25f, or when an accelerator is not operated, the engine 22 is autonomously operated, overheating of the PM filter 25f is suppressed as compared with a case where fuel cut of the engine 22 is performed. However, such control may be performed only when the maintenance mode is set by a dealer or the like. In the maintenance mode, since the driver (for example, a dealer worker) recognizes that the maintenance mode is set, even when the engine 22 is autonomously operated (even when fuel cut of the engine 22 and motoring of the engine 22 by the motor MG1 are not performed) when an accelerator is not operated and the braking force of the vehicle is reduced, the driver is less likely to feel uncomfortable. In this case, when the maintenance mode is not set, when an accelerator is not operated when the deposition amount Qpm of PM is equal to or higher than the threshold value Qpmref, fuel cut of the engine 22 is permitted to be performed. Therefore, when the engine 22 is operated, output (target power Pe*) of the engine 22 is limited so that the filter temperature Tf is reduced, and thus overheating of the PM filter 25f when fuel cut of the engine 22 is performed is considered to be suppressed.

In the hybrid vehicle 20 of the embodiment, the D position, the B position, or the S position is provided as the shift position SP, but at least one of the B position or the S position may be not provided.

In the hybrid vehicle 20 of the embodiment, the battery 50 is used as the power storage device, but the capacitor may be used instead of the battery 50.

The hybrid vehicle 20 of the embodiment includes the engine ECU 24, the motor ECU 40, the battery ECU 52, and the HVECU 70, but at least two of the ECUs may be configured as a single electronic control unit.

The correspondence between the main elements of the embodiment and the main elements of the present disclosure described in the Summary section will be described. In the embodiment, the engine 22 corresponds to the "engine", the motor MG1 corresponds to the "first motor", the planetary gear 30 corresponds to the "planetary gear", the motor MG2 corresponds to the "second motor", the battery 50 corresponds to the "power storage device", and the HVECU 70, the engine ECU 24, and the motor ECU 40 correspond to the "control device".

The correspondence between the main elements of the embodiment and the main elements of the present disclosure described in the Summary section is not construed to limit elements of the present disclosure described in the Summary section, since the embodiment is an example to specifically describe the mode for carrying out the present disclosure described in the Summary section. That is, the interpretation of the present disclosure described in the Summary section should be made based on the description of the section, and the embodiment is only the specific example of the present disclosure described in the Summary section.

As described above, the aspect of implementing the present disclosure has been described using the embodiment. However, an applicable embodiment of the present disclosure is not limited to the embodiment, and various modifications could be made without departing from the scope of the present disclosure.

The present disclosure can be used in the manufacturing industry of hybrid vehicles.

What is claimed is:

1. A hybrid vehicle comprising:
   an engine in which a filter for removing particulate matter is attached to an exhaust system;
   a first motor,
   a planetary gear in which three rotational elements are connected to the engine, the first motor, and a drive shaft coupled to an axle, such that the first motor, the engine, and the drive shaft are arranged in this order in a collinear diagram;
   a second motor configured to be connected to the drive shaft;
   a power storage device configured to exchange an electric power with the first motor and the second motor; and
   a control device configured to apply a braking force to a vehicle by motoring the engine, in which fuel injection is stopped, by the first motor and/or regenerative driving of the second motor, when an accelerator is not operated, wherein the control device limits motoring of the engine, in which fuel injection is stopped, by the first motor, in a case where a deposition amount of particulate matter deposited on the filter is equal to or higher than a predetermined amount, when an accelerator is not operated.

2. The hybrid vehicle according to claim 1, wherein the control device is configured to autonomously operate the engine, in a case where the deposition amount is equal to or higher than the predetermined amount, when an accelerator is not operated.

3. The hybrid vehicle according to claim 1, wherein the control device is configured to prohibit selection of a brake position at which a request braking force when an accelerator is not operated is larger than a drive position, as a shift position, in a case where the deposition amount is equal to or higher than the predetermined amount.

4. The hybrid vehicle according to claim 1, wherein the control device is configured to prohibit selection of a sequential position at which a request braking force when an accelerator is not operated is changed in a plurality of stages, as a shift position, in a case where the deposition amount is equal to or higher than the predetermined amount.

5. The hybrid vehicle according to claim 1, wherein the control device is configured to control the engine so that an air-fuel ratio becomes lean, in a case where the deposition amount is equal to or higher than the predetermined amount, when the engine is operated.

6. The hybrid vehicle according to claim 1, wherein the control device is configured to limit motoring of the engine by the first motor as compared with a case where the deposition amount is lower than the predetermined amount, in a case where the deposition amount is equal to or higher than the predetermined amount, when an accelerator is not operated in a maintenance mode.

* * * * *